Figure 1:
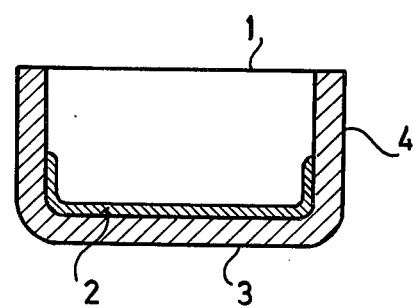

United States Patent [19]
Reunanen

[11] 3,935,449
[45] Jan. 27, 1976

[54] METHOD FOR CALIBRATION MEASUREMENT IN A LIQUID SCINTILLATION COUNTER AND CARRIER USED IN THE METHOD

[75] Inventor: Matti Antero Reunanen, Abo, Finland

[73] Assignee: Wallac Oy, Abo, Finland

[22] Filed: Nov. 2, 1973

[21] Appl. No.: 412,351

[30] Foreign Application Priority Data
Nov. 3, 1972  Sweden............................ 14284/72

[52] U.S. Cl. ................ 250/252; 250/303; 250/364
[51] Int. Cl. ............................................. G01t 1/00
[58] Field of Search ........... 250/252, 303, 364, 363, 250/493, 496, 363

[56] References Cited
UNITED STATES PATENTS
| | | | |
|---|---|---|---|
| 2,907,881 | 10/1959 | Roucayrol............................ | 250/364 |
| 3,437,812 | 4/1969 | Packard............................. | 250/364 |
| 3,500,447 | 3/1970 | Frank................................. | 250/252 |

Primary Examiner—Harold A. Dixon

[57] ABSTRACT

The present invention relates to a method for use in liquid scintillation measurements to feed an accurately determined amount of radioactive substance to a fluid scintillation system for a calibration measurement. According to the invention an accurately determined amount of radioactive substance is adsorbed to a carrier, which is introduced into the fluid scintillation system. The invention also relates to a carrier for use in the method.

14 Claims, 1 Drawing Figure

U.S. Patent  Jan. 27, 1976  3,935,449

METHOD FOR CALIBRATION MEASUREMENT IN A LIQUID SCINTILLATION COUNTER AND CARRIER USED IN THE METHOD

The present invention relates to a method to feed at a calibration measurement in a liquid scintillation counter an accurately determined amount of radioactive substance into a fluid scintillation system, the radioactive substance used being soluble in the scintillation system, as well as a carrier for use in the method.

In liquid scintillation measurements it is generally of interest to calculate the total radiation from the sample which is subject to measurement. This absolute efficiency can be calculated from the number of light pulses, which are detected by a photomultiplicator, for instance, if the extent of quenching, caused by optical and chemical effects in the sample, is known. Therefore, in order to compensate appropriately a measurement result obtained in measurement of the radioactivity in a sample in a liquid scintillation counter a calibration measurement has to be carried out. This calibration measurement is performed with an accurately known amount of radioactive substance, and with the remaining measurement conditions being in as close agreement as possible with the conditions during the measurement of the sample. Usually the calibration measurement is carried out in that way that a so called quenching curve is drawn. The quenching is most often expressed by means of the so called channel ratio method, based on the fact that the quotient between the number of counts within two amplitude intervals (channels) is a function of the quenching degree of the sample. A calibration curve thus shows the ratio of the quenching to the channel ratio. Such a curve is achieved by means of a number of standard samples each containing a certain amount of radioactive substance and a quenching liquid to varying amounts. As the amount of radioactive material is known in each sample, the quenching can be calculated in each sample, and a calibration curve showing the quenching and the function of the channel ratio can be drawn. Alternatively a calibration curve can be obtained in the way shown in the U.S. Pat. No. 3,763,371. In these methods of obtaining a calibration curve, accurately determined amounts of radioactive substance have to be added to one or more standard solutions. Then the radioactive substance can be dosed in the laboratory in connection with the calibration measurement. It is however difficult to obtain in that way an amount of radioactive substance, in exact agreement throughout the whole sample series. Further, great care is required when working with radioactive substances in the laboratory, which applies also if radioactive substance should be added only to one sample. Therefore this method is timeconsuming. On the contrary, commercially available sample series could be used in the calibration measurement, containing a certain amount of radioactive substance as well as scintillator and solvent to a certain volume, and containing varying amounts of a quenching material. The disadvantage of this method is that the measurement conditions in such a commercially available sample series may diverge more or less from the conditions of the sample, the radioactivity of which should be determined. It may for instance be desirable to perform the measurement of the sample in a volume or with a scintillator other than in the commercially available sample series. The accuracy of the calibration curve obtained will fall off accordingly.

The purpose of the present invention is to provide a method by means of which an accurate dosing of radioactive substance rapidly, safely and with great accuracy can be carried out in one or more calibration samples. It is also an object of the present invention to provide a carrier to be used in the method.

It is also a purpose of the present invention to provide a method by means of which an accurately determined amount of radioactive substance can be measured out automatically on an industrial scale, followed by dosing adapted to individual measurement conditions.

The characteristics of the invention are obvious from the claims following the specification.

The invention will now be further explained with reference to the attached drawing showing a carrier for use in the method according to the invention.

In the FIGURE, 1 denotes a carrier, which preferably consists of a cylinder, closed in one end, but which may be designed in some other way. The carrier has such dimensions that it can be introduced into a measurement vial, used in the measurement. 2 denotes the radioactive substance, adsorbed onto the carrier. The carrier is designed as a bowl, the bottom of which is denoted by 3 and the edge of which is denoted by 4. The radioactive substance is suitably applied to the carrier, dissolved to an accurately determined concentration in a solvent, the solution being added to the carrier in an accurately determined volume. The solution volume desired is suitably dosed by means of an automatic pipette. After the solution has been dosed into the carrier the solvent which suitably consists of a volatile liquid, is allowed to evaporate leaving the radioactive substance, which is preferably of low volatility, on the carrier in a thin layer, preferably adsorbed on its bottom 3 and the lower parts of its edge 4. The design of the carrier allows several carriers to be placed one above the other in storage and transport, for instance in a package tube, the edge 4 then preventing the radioactive substance from getting into contact with the carrier, situated next above. In preparation of a calibration sample for a series of calibration samples the accurately determined amount of radioactive substance is supplied to the fluid scintillation system, in that way that the carrier having the radioactive substance adsorbed to it, is immersed into the scintillation system, whereby the radioactive substance is dissolved. The term "fluid scintillation system" is in this connection directed towards solvent, scintillator or primary solute, wave-length shifter or secondary solute and quenching agent, where appropiate. During the measurement, the scintillation system is contained in a measurement vial. The dosing is suitably performed directly into the measurement vial intended for the calibration measurement, in which the fluid scintillation system first can be added into the measurement vial, after which the carrier with its adsorbed substance is introduced into the measurement vial and immersed into the fluid scintillation system. Alternatively the carrier with adsorbed radioactive substance is introduced into the measurement vial after which a desired amount of fluid scintillation system is supplied. It is preferred that the carrier remains in the measurement vial during the calibration measurement.

A prerequisite for the forming of the method according to the present invention is that the radioactive substance is soluble in the fluid scintillation system. If the calibration measurement is related to measurement of the radioactivity of a water soluble sample and the fluid scintillation system consequently is adapted thereto, a preferred radioactive substance is radioactively marked saccharose. If the calibration measurement is related to measurement of the radioactivity of a sample soluble in a non-polar solvent and the scintillation system consequently is adapted thereto, preferred radioactive substances are radioactively marked tripalritate and tristearate.

The carrier used in the method according to the present invention can be made of glass, plastic or metal. The carrier is suitably made of a transparent material, preferably glass.

The method and carrier according to the present invention thus permit that the measuring out of an accurately determined amount of radioactive substance can be performed automatically and on an industrial scale, after which the accurately determined radioactive doses are distributed to the user, who simply and rapidly performs the dosing at the calibration measurement, in which the measurement conditions can be individually adapted according to that sample the measurement of which the calibration measurement is related to. This entails an essential advantage, compared to the known art.

I claim:

1. Method for feeding an accurately determined amount of radioactive substance to a fluid scintillation system for a calibration measurement in a liquid scintillation counter, the method comprising the steps of feeding of a carrier to said fluid scintillation system, said carrier having the radioactive substance adsorbed to it, and allowing said radioactive substance to dissolve in said fluid scintillation system.

2. Method for feeding an accurately determined amount of radioactive substance to a fluid scintillation system for a calibration measurement in a liquid scintillation counter, the method comprising the steps of supplying of a fluid scintillation system into a measurement vial, introducing into said measurement vial a carrier having adsorbed to it a radioactive substance of a type soluble in said fluid scintillation system, immersing said carrier into said fluid scintillation system and allowing said radioactive substance to dissolve in said fluid scintillation system.

3. Method according to claim 2 where said fluid scintillation system is based on water as solvent, in which said radioactive substance is radioactively marked saccharose.

4. Method according to claim 2 where said fluid scintillation system is based on a non-polar solvent, in which said radioactive substance is radioactively marked tripalmitate.

5. Method according to claim 2 where said fluid scintillation system is based on a non-polar solvent, in which said radioactive substance is radioactively marked tristearate.

6. Method for feeding an accurately determined amount of radioactive substance to a fluid scintillation system for a calibration measurement in a liquid scintillation counter, the method comprising the steps of introducing into a measuring vial a carrier having a radioactive substance adsorbed to it, supplying into said measurement vial a fluid scintillation system of a type in which said radioactive substance is soluble, and allowing said radioactive substance to dissolve in said fluid scintillation system.

7. Method according to claim 6 where said fluid scintillation system is based on water as solvent, in which said radioactive substance is radioactively marked saccharose.

8. Method according to claim 6 where said fluid scintillation system is based on a non-polar solvent, in which said radioactive substance is radioactively marked tripalmitate.

9. Method according to claim 6 where said fluid scintillation system is based on a non-polar solvent, in which said radioactive substance is radioactively marked tristearate.

10. Method for feeding an accurately determined amount of radioactive substance to a fluid scintillation system for a calibration measurement in a liquid scintillation counter, the method comprising the steps of dosing of an accurately determined amount of a solution to a carrier, said solution comprising a volatile solvent and a radioactive substance of low volatility, followed by evaporation of said solvent, introducing said carrier having said radioactive substance adsorbed to it, together with a fluid scintillation system into a measurement vial and allowing said radioactive substance to dissolve in said fluid scintillation system.

11. Carrier for use in a calibration measurement when feeding to a fluid scintillation system an accurately determined amount of radioactive substance, said carrier comprising a bowl-shaped element having said radioactive substance adsorbed to part of its concave inner surface.

12. Carrier according to claim 11, consisting of a cylinder, closed at one end.

13. Carrier according to claim 11, consisting of a transparent material.

14. Carrier according to claim 12, consisting of glass.

* * * * *